(12) United States Patent
Wang et al.

(10) Patent No.: US 12,310,349 B2
(45) Date of Patent: May 27, 2025

(54) MOSQUITO TRAPPING DEVICE

(71) Applicant: FOSHAN GREENYELLOW ELECTRIC TECHNOLOGY CO., LTD., Foshan (CN)

(72) Inventors: Ruofei Wang, Foshan (CN); Xinzong Qin, Foshan (CN); Shanheng Wen, Foshan (CN)

(73) Assignee: FOSHAN GREENYELLOW ELECTRIC TECHNOLOGY CO., LTD., Foshan (CN)

( * ) Notice: Subject to any disclaimer, the term of this patent is extended or adjusted under 35 U.S.C. 154(b) by 0 days.

(21) Appl. No.: 18/608,965

(22) Filed: Mar. 19, 2024

(65) Prior Publication Data

US 2025/0057140 A1    Feb. 20, 2025

Related U.S. Application Data

(63) Continuation of application No. PCT/CN2023/118222, filed on Sep. 12, 2023.

(30) Foreign Application Priority Data

Aug. 18, 2023   (CN) .......................... 202322241226.8

(51) Int. Cl.
*A01M 1/06*    (2006.01)
*A01M 1/10*    (2006.01)

(52) U.S. Cl.
CPC .............. *A01M 1/06* (2013.01); *A01M 1/106* (2013.01)

(58) Field of Classification Search
CPC ........... A01M 1/06; A01M 1/10; A01M 1/106
See application file for complete search history.

(56) References Cited

U.S. PATENT DOCUMENTS

| | | | | |
|---|---|---|---|---|
| 5,052,147 | A * | 10/1991 | Broomfield | A01M 3/005 |
| | | | | 43/139 |
| 6,134,826 | A * | 10/2000 | Mah | A01M 1/223 |
| | | | | 43/99 |
| 9,883,666 | B1 * | 2/2018 | Conklin | A01M 1/145 |
| 10,701,923 | B2 * | 7/2020 | Horne | A01M 1/04 |

(Continued)

FOREIGN PATENT DOCUMENTS

| | | | | |
|---|---|---|---|---|
| CN | 105941368 A | * | 9/2016 | .............. A01M 1/06 |
| CN | 108552129 A | | 9/2018 | |

(Continued)

OTHER PUBLICATIONS

Merged translation of EP-0746977 (Year: 1996).*

(Continued)

*Primary Examiner* — Morgan T Jordan
(74) *Attorney, Agent, or Firm* — Bayramoglu Law Offices LLC

(57) ABSTRACT

A mosquito trapping device includes a body, a mosquito storage box, a fan, and a lattice cover assembly, where the lattice cover assembly is arranged on an upper end portion of the body and forms a first accommodation space with the body, and the mosquito storage box is mounted on the body; the fan causes air to flow through air inlet portions so as to enter the mosquito box and subsequently flow through the accommodation space and air outlets which together form an air duct used to trap mosquitos in the mosquito storage box.

10 Claims, 6 Drawing Sheets

(56) References Cited

U.S. PATENT DOCUMENTS

| | | | |
|---|---|---|---|
| 10,791,726 B2* | 10/2020 | Zheng | A01M 1/023 |
| 11,116,198 B2 | 9/2021 | Hauptmann et al. | |
| 11,330,812 B2* | 5/2022 | Qin | A01M 1/06 |
| 2003/0051391 A1* | 3/2003 | Jablin | A01M 1/023 |
| | | | 43/139 |
| 2008/0168702 A1* | 7/2008 | Jaffrey | A01M 1/223 |
| | | | 43/118 |
| 2011/0030266 A1* | 2/2011 | Roy | A01M 1/08 |
| | | | 43/113 |
| 2012/0246998 A1* | 10/2012 | Vasudeva | A01M 1/023 |
| | | | 43/123 |
| 2013/0064679 A1* | 3/2013 | Tsai | A01M 1/06 |
| | | | 416/247 R |
| 2014/0013655 A1* | 1/2014 | Southard | A01M 1/2094 |
| | | | 43/139 |
| 2014/0137462 A1* | 5/2014 | Rocha | A01M 1/023 |
| | | | 43/113 |
| 2014/0165452 A1* | 6/2014 | Rocha | A01M 1/08 |
| | | | 43/139 |
| 2017/0258068 A1* | 9/2017 | Eom | A01M 1/106 |
| 2018/0288992 A1* | 10/2018 | Gallegos | A01M 1/106 |
| 2019/0008132 A1* | 1/2019 | Eom | A01M 1/06 |
| 2021/0045377 A1* | 2/2021 | Qin | A01M 1/023 |
| 2022/0132824 A1* | 5/2022 | Toledo | A01M 1/145 |
| | | | 43/113 |

FOREIGN PATENT DOCUMENTS

| | | | | |
|---|---|---|---|---|
| CN | 209218991 U | 8/2019 | | |
| CN | 209403366 U | 9/2019 | | |
| CN | 110839606 A | 2/2020 | | |
| CN | 210901043 U | 7/2020 | | |
| CN | 211020647 U | 7/2020 | | |
| CN | 211631465 U | 10/2020 | | |
| EP | 0746977 A1 * | 12/1996 | | |
| GB | 2191376 A * | 12/1987 | | A01M 1/06 |
| KR | 20180054140 A | 5/2018 | | |
| KR | 20190000473 A * | 1/2019 | | |
| KR | 20210013918 A * | 2/2021 | | |
| WO | 2014077932 A1 | 5/2014 | | |
| WO | 2019221014 A1 | 11/2019 | | |
| WO | WO-2023136818 A1 * | 7/2023 | | A01M 1/02 |

OTHER PUBLICATIONS

Merged translation of CN-105941368 (Year: 2016).*
Merged translation of KR-20190000473-A (Year: 2019).*
Merged translation of KR-20210013918-A (Year: 2021).*

* cited by examiner

MOSQUITO TRAPPING DEVICE

CROSS REFERENCE TO THE RELATED APPLICATIONS

This application is the continuation application of International Application No. PCT/CN2023/118222, filed on Sep. 12, 2023, which is based upon and claims priority to Chinese Patent Application No. 202322241226.8, filed on Aug. 18, 2023, the entire contents of which are incorporated herein by reference.

TECHNICAL FIELD

The present disclosure relates to the field of mosquito trapping apparatuses, and in particular to a mosquito trapping device.

BACKGROUND

Mosquito trapping machines are also called mosquito trapping devices, mosquito control machines, ecological mosquito trapping machines, ecological mosquito control machines, ecological mosquito control systems. The mosquito trapping machines originated in the United States in the 1990s and have been gradually popularized in the Chinese market since 2003. Such premium mosquito control products have become popular in recent years to control the mosquito harm.

As shown in the patent documents with application Nos. 201921978518.7, 201921721518.9, etc., it is common practice to provide an existing mosquito trapping device with various attractive elements involving an odor, a body odor, a sound, a color, a light, a temperature, humidity, and electric shock, so as to realize a remarkable mosquito trapping and control effect. Consequently, a structure is complex and a cost is extremely high. The most common and frequently-used light-attractive mosquito trapping and control devices are provided with mosquito attraction lamps or mosquito control lamps, while their structures are still complex.

SUMMARY

An objective of the present disclosure is to provide a mosquito trapping device having a simple structure and a low cost, so as to solve at least one of the above problems.

In a first aspect, the present disclosure provides a mosquito trapping device. The device includes a body, a mosquito storage box, a fan, and a lattice cover assembly, where the lattice cover assembly is arranged on an upper end portion of the body and forms a first accommodation space with the body, and the mosquito storage box is mounted on the body; the lattice cover assembly includes a first lattice cover, a second lattice cover, and a third lattice cover, where the first lattice cover is mounted on the upper end portion of the body and provided with a first air outlet portion in communication with the first accommodation space, the second lattice cover sits in a middle of the first lattice cover and is positioned at a periphery of the fan, the third lattice cover is mounted on the second lattice cover and positioned right above the fan, and the third lattice cover is provided with a first air inlet portion matching the fan; the mosquito storage box is provided with a second air inlet portion positioned right below the fan and a third air outlet portion in communication with the first accommodation space; the first lattice cover is provided with a tank, and an upper end portion of the second lattice cover is positioned in the tank; the first air outlet portion is arranged on a tank wall of the tank; and when the fan is in use, air sequentially flows through the first air inlet portion and the second air inlet portion, so as to enter the mosquito storage box, and then sequentially flows through the third air outlet portion and the first accommodation space, so as to be blown out from the first air outlet portion, so that a first air duct is formed.

In this way, the present disclosure provides the mosquito trapping device in a novel structure. In the device, when the fan is in use, the air sequentially flows through the first air inlet portion and the second air inlet portion, so as to enter the mosquito storage box, and then sequentially flows through the third air outlet portion and the first accommodation space, so as to be blown out from the first air outlet portion, so that the first air duct is formed. Accordingly, mosquitoes around can be effectively trapped into the mosquito storage box through the air duct structure. The fan is the only power consuming component for mosquito trapping, and no other complex mosquito trapping and attracting facilities are used. An entire structure is simple, the cost is low, and a mosquito trapping function can be realized through the special structure design.

In addition, the first lattice cover is provided with the tank, so that an air outlet area can be expanded, and an air outletting force can be weakened. The first air outlet portion is arranged on the tank wall of the tank, so that an air outlet direction is perpendicular to an air inlet direction, and an air outlet surrounds a periphery of an air inlet. Accordingly, the air inlet will not be disturbed, and an attractant odor can be diffused, so that the attractant odor surrounds a periphery of the air inlet all the time.

In some embodiments, the second lattice cover is provided with a second air outlet portion in communication with the first accommodation space; and when the fan is in use, air sequentially flows through the first air inlet portion and the second air inlet portion, so as to enter the mosquito storage box, and then sequentially flows through the third air outlet portion and the first accommodation space, so as to be blown out from the second air outlet portion, so that a second air duct is formed.

In this way, when the fan is in use, the air sequentially flows through the first air inlet portion and the second air inlet portion, so as to enter the mosquito storage box, and then sequentially flows through the third air outlet portion and the first accommodation space, so as to be blown out from the first air outlet portion, so that the first air duct is formed; and the air sequentially flows through the first air inlet portion and the second air inlet portion, so as to enter the mosquito storage box, and then sequentially flows through the third air outlet portion and the first accommodation space, so as to be blown out from the second air outlet portion, so that the second air duct is formed. Accordingly, the device is formed into an air duct structure having one air inlet passage and two air outlet passages when the fan is in use. The mosquitoes around can be effectively trapped into the mosquito storage box through the air duct structure. The fan is the only power consuming component for mosquito trapping, and no other complex mosquito trapping and attracting facilities are used. The entire structure is simple, the cost is low, and the mosquito trapping function can be realized through the special structure design.

In some embodiments, the mosquito trapping device further includes a support and a support cover, where the support is mounted in the body and provided with a second accommodation space configured to accommodate the mosquito storage box; and the mosquito storage box is detachably mounted in the second accommodation space, the support cover is mounted above the support, and the fan is mounted above the support cover. In this way, the mosquito storage box is detachably arranged, so that the mosquitoes trapped in the box can be cleared in time, and repeated use can be realized.

In some embodiments, the support cover is provided with a first bulging portion extending upwards, and the first bulging portion is provided with an accommodation tank configured to accommodate the fan; and the second lattice cover is internally provided with a second bulging portion extending downwards, the second bulging portion is linked with the first bulging portion, and the second bulging portion is positioned on an inner side of the second air outlet portion. In this way, the first bulging portion and the second bulging portion can separate the air inlet passage from the air outlet passages. This structure also serves as a primary structure for forming the two air outlet passages.

In some embodiments, the mosquito trapping device further includes a grill, where the grill is mounted on the support cover and positioned right below the fan, the accommodation tank is delimited by the grill and the first bulging portion, and the grill is provided with a first through hole in communication with the accommodation tank. In this way, the grill plays a role of supporting the fan without affecting air inletting.

In some embodiments, the mosquito trapping device further includes an attractant accommodation portion, where the attractant accommodation portion is provided with an opening end, and the opening end is in communication with the tank. In this way, the attractant accommodation portion is configured to place the attractant, so as to enhance a mosquito attraction function.

In some embodiments, the mosquito trapping box includes a box body, a lattice-shaped member, a fixing member, and a cover body, where the lattice-shaped member is mounted on an inner wall of the box body through the fixing member, the cover body is mounted on an upper end portion of the box body, and an accommodation cavity is delimited by the lattice-shaped member, the cover body, and the box body jointly; and the second air inlet portion is arranged on the cover body, and the third air outlet portion is arranged on the box body and/or the lattice-shaped member.

The second air inlet portion includes a second through hole formed on the cover body, and the third air outlet portion includes a third through hole formed at a bottom of the box body and/or lattice holes formed on the lattice-shaped member.

The mosquito trapping box further includes a shielding portion configured to shield the second through hole, and the shielding portion includes a pair of shielding sheets rotatably mounted on the cover body; when the fan does not work, the shielding sheets are attached to the cover body, so as to completely shield the second through hole, so that the second through hole is closed; and when the fan is in use, the shielding sheets move away from the cover body under the action of air, so that the second through hole is opened.

In this way, the mosquito trapping box of the present disclosure has a simple structure, and can effectively ensure that the air ducts normally run while ensuring that the mosquitoes are effectively trapped in the box body.

In some embodiments, the mosquito trapping device further includes a control portion and a power supply portion; where the control portion includes a control panel mounted on the first lattice cover and a control circuit board arranged in the first accommodation space; and the power supply portion includes a power plug, and the power plug, the control panel, and the fan are connected to the control circuit board through wires.

The present disclosure has the beneficial effects as follows: The present disclosure provides the mosquito trapping device in the novel structure. According to the device, the mosquitoes around can be effectively trapped into the mosquito storage box through the air duct structure. The fan is the only power consuming component for mosquito trapping, and no other complex mosquito trapping and attracting facilities are used. The entire structure is simple, the cost is low, and the mosquito trapping function can be realized through the special structure design.

The first lattice cover is provided with the tank, so that the air outlet area can be expanded, and the air outletting force can be weakened. The first air outlet portion is arranged on the tank wall of the tank, so that the air outlet direction is perpendicular to the air inlet direction, and the air outlet surrounds the periphery of the air inlet. Accordingly, the air inlet will not be disturbed, and the attractant odor can be diffused, so that the attractant odor surrounds the periphery of the air inlet all the time.

When the fan is in use, the air sequentially flows through the first air inlet portion and the second air inlet portion, so as to enter the mosquito storage box, and then sequentially flows through the third air outlet portion and the first accommodation space, so as to be blown out from the first air outlet portion, so that the first air duct is formed; and the air sequentially flows through the first air inlet portion and the second air inlet portion, so as to enter the mosquito storage box, and then sequentially flows through the third air outlet portion and the first accommodation space, so as to be blown out from the second air outlet portion, so that the second air duct is formed. Therefore, the device is formed into the air duct structure having one air inlet passage and two air outlet passages when the fan is in use.

Figure 1:
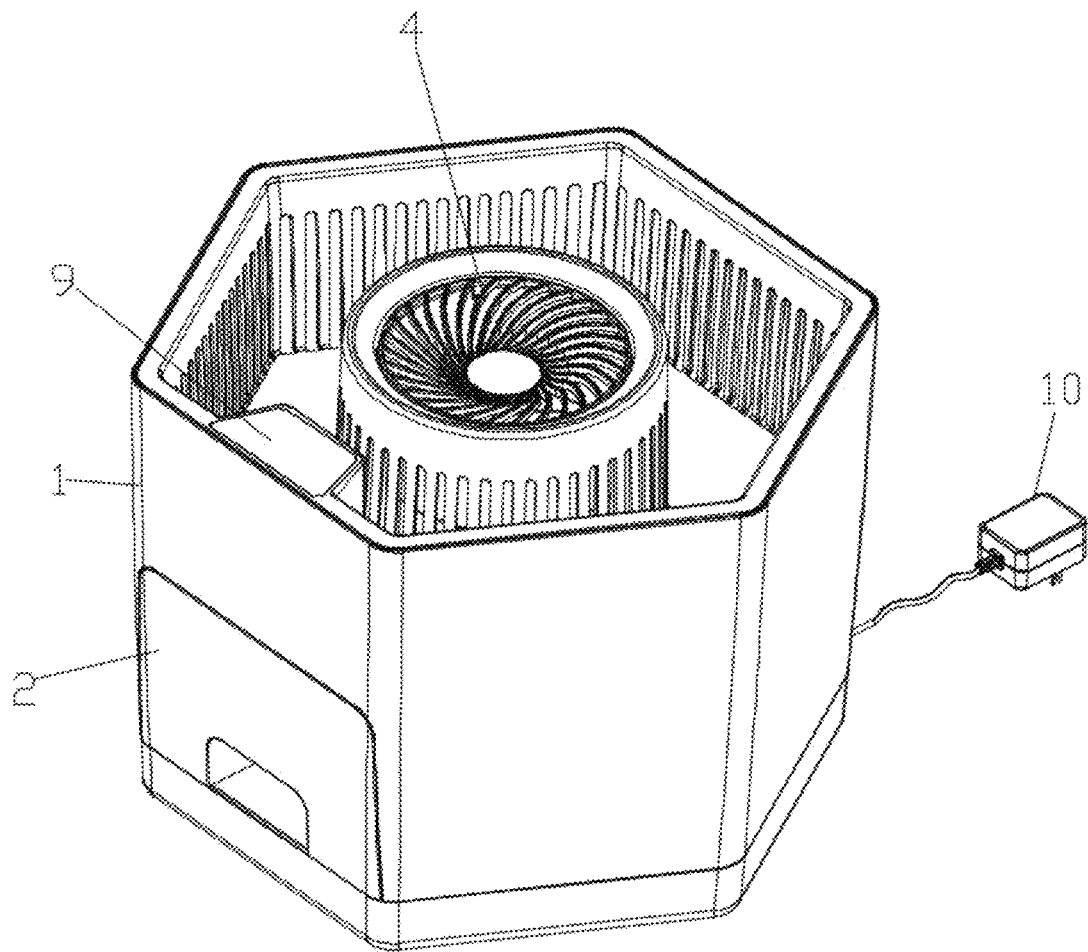
FIG. 1 is a solid schematic structural diagram of a mosquito trapping device according to an embodiment of the present disclosure.
Figure 2:
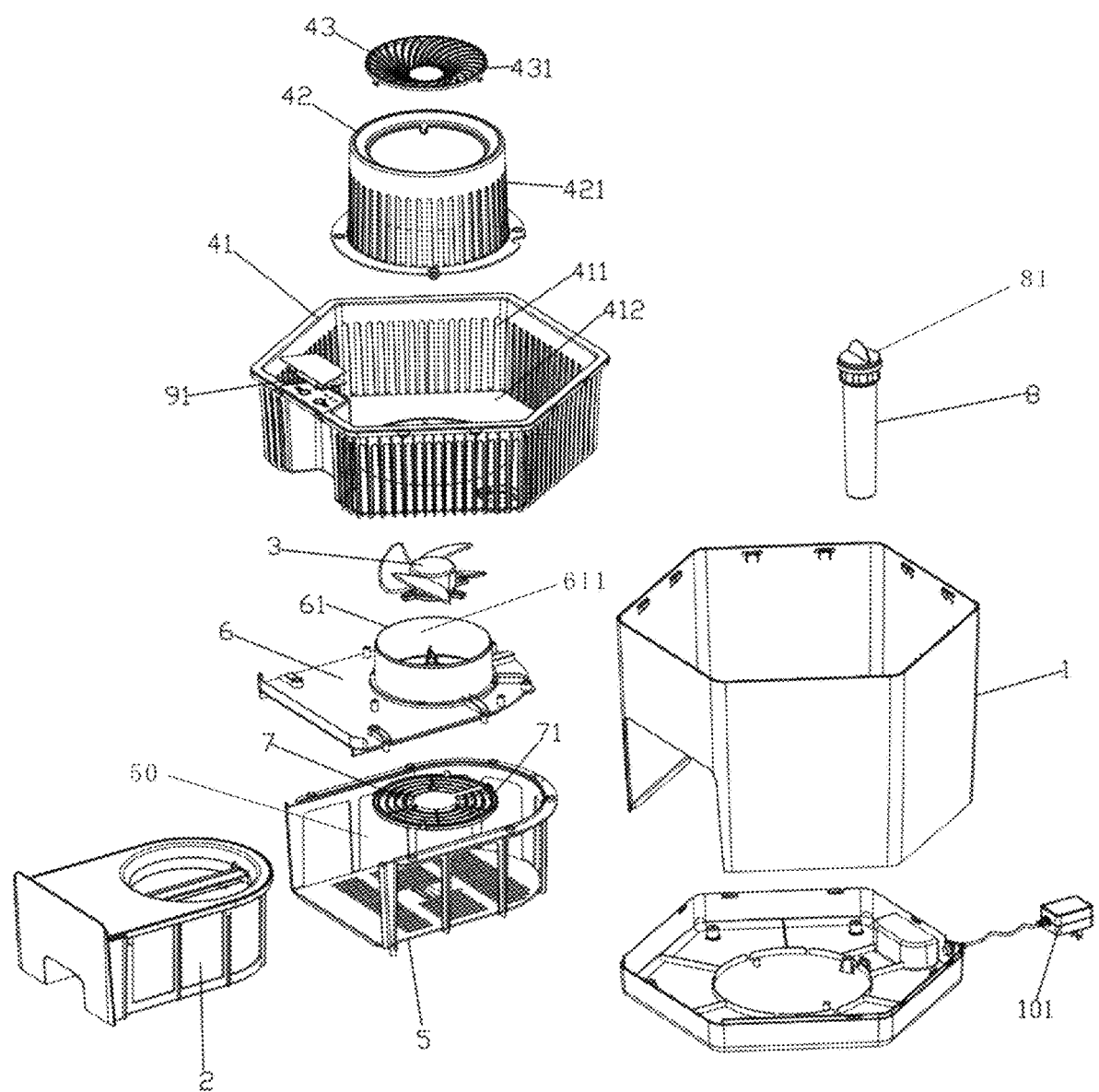
FIG. 2 is an exploded schematic structural diagram of the mosquito trapping device shown in FIG. 1.
Figure 3:
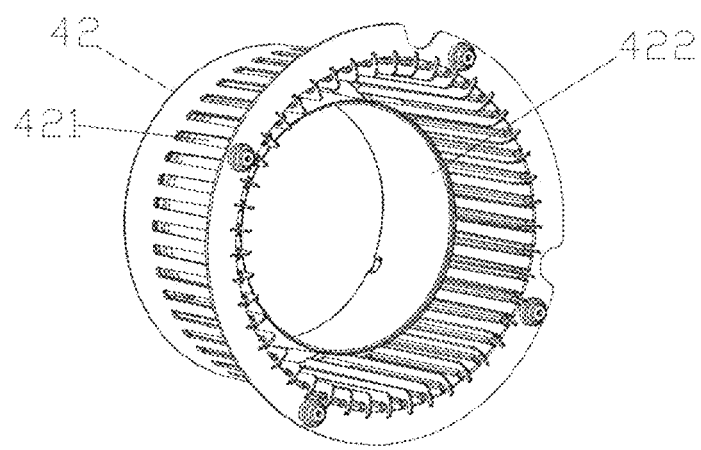
FIG. 3 is a solid schematic structural diagram of a second lattice cover of the mosquito trapping device shown in FIG. 2.
Figure 4:
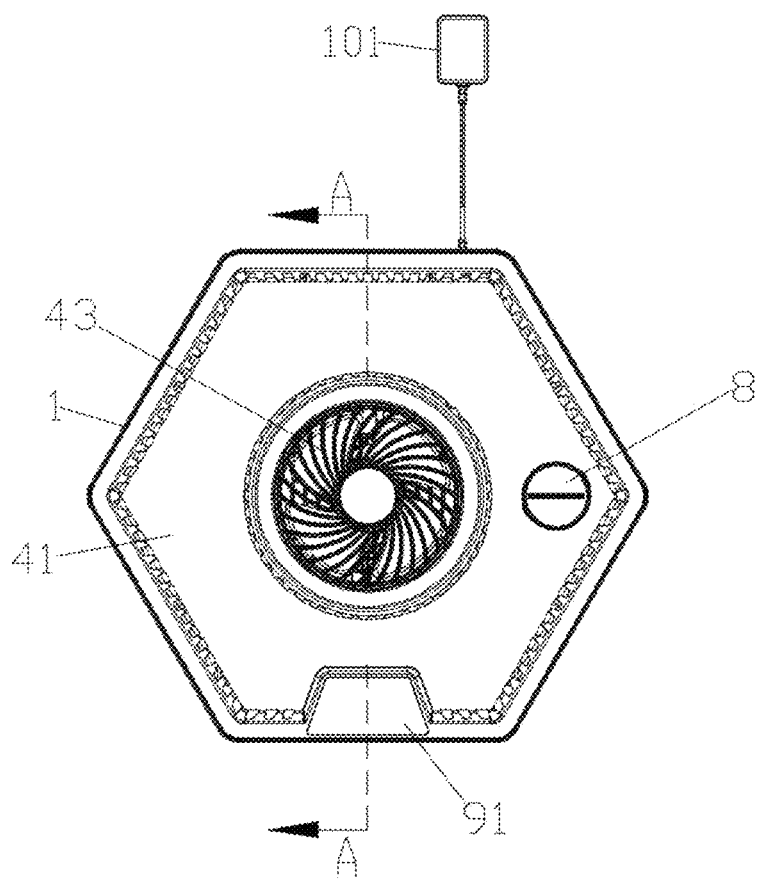
FIG. 4 is a top-view schematic structural diagram of the mosquito trapping device shown in FIG. 1.
Figure 5:
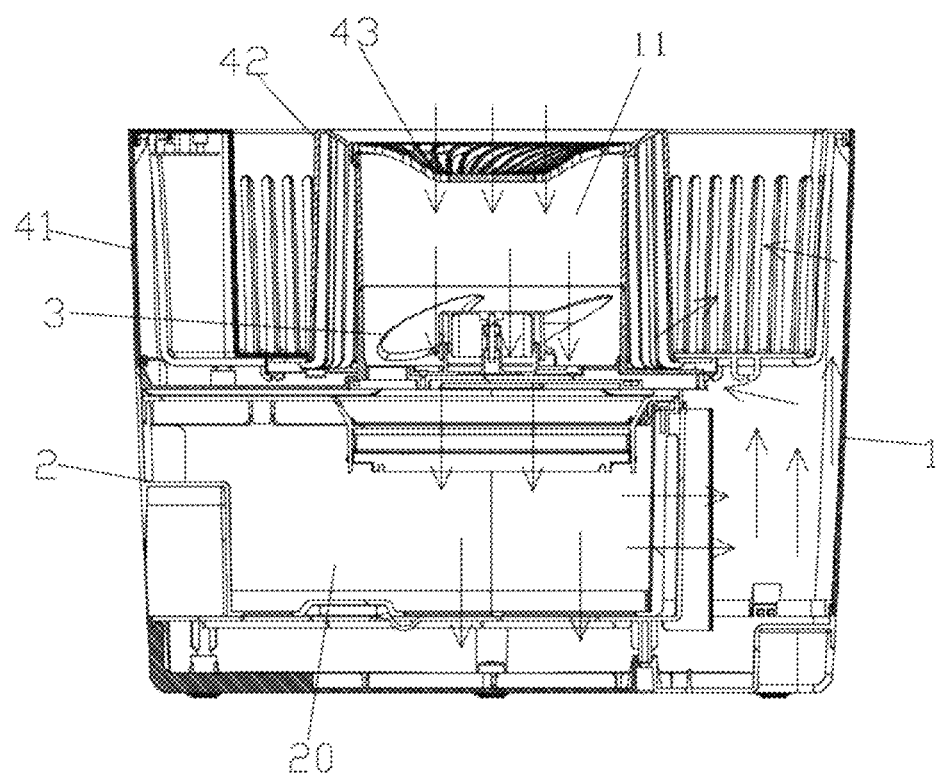
FIG. 5 is a sectional-view schematic structural diagram of the mosquito trapping device in direction A-A shown in FIG. 4.

Reference numerals in FIGS. 1-7: 1-body; 2-mosquito storage box; 3-fan; 4-lattice cover assembly; 5-support; 6-support cover; 7-grill; 8-attractant accommodation portion; 9-control portion; 10-power supply portion; 11-first accommodation space; 20-accommodation cavity; 21-box body; 22-lattice-shaped member; 23-fixing member; 24-cover body; 25-shielding portion; 41-first lattice cover; 42-second lattice cover; 43-third lattice cover; 50-second accommodation space; 61-first bulging portion; 71-first through hole; 81-opening end; 91-control panel; 101-power plug; 211-third air outlet portion; 241-second air inlet portion; 251-shielding sheet; 411-first air outlet portion; 412-plate; 421-second air outlet portion; 422-second bulging portion; 431-first air inlet portion; 611-accommodation tank; and 211a-third through hole.

DETAILED DESCRIPTION OF THE EMBODIMENTS

The present disclosure will be further described in detail below with reference to the accompanying drawings and specific examples.

Example 1

FIGS. 1-7 illustratively shows a mosquito trapping device according to an embodiment of the present disclosure.

As shown in FIGS. 1-7, the mosquito trapping device includes a body 1, a mosquito storage box 2, a fan 3, and a lattice cover assembly 4, where the lattice cover assembly 4 is arranged on an upper end portion of the body 1 and forms a first accommodation space 11 with the body 1, and the mosquito storage box 2 is mounted on the body 1; the lattice cover assembly 4 includes a first lattice cover 41, a second lattice cover 42, and a third lattice cover 43, where the first lattice cover 41 is mounted on the upper end portion of the body 1 and provided with a first air outlet portion 411 in communication with the first accommodation space 11, the second lattice cover 42 sits in a middle of the first lattice cover 41 and is positioned at a periphery of the fan 3, the second lattice cover 42 is provided with a second air outlet portion 421 in communication with the first accommodation space 11, the third lattice cover 43 is mounted on the second lattice cover 42 and positioned right above the fan 3, and the third lattice cover 43 is provided with a first air inlet portion 431 matching the fan 3; and the mosquito storage box 2 is provided with a second air inlet portion 241 positioned right below the fan 3 and a third air outlet portion 211 in communication with the first accommodation space 11.

In the present embodiment, the first air outlet portion 411, the second air outlet portion 421, the first air inlet portion 431, etc. may be holes in various shapes through which air can pass.

The mosquito trapping device further includes a support 5 and a support cover 6, where the support 5 is mounted in the body 1 and provided with a second accommodation space 50 configured to accommodate the mosquito storage box 2; and the mosquito storage box 2 is detachably mounted in the second accommodation space 50, the support cover 6 is mounted above the support 5, and the fan 3 is mounted above the support cover 6. In this way, the mosquito storage box 2 is detachably arranged, so that mosquitoes trapped in the box can be cleared in time, and repeated use can be realized.

The support cover 6 is provided with a first bulging portion 61 extending upwards, and the first bulging portion 61 is provided with an accommodation tank 611 configured to accommodate the fan 3; and the second lattice cover 42 is internally provided with a second bulging portion 422 extending downwards, the second bulging portion 422 is linked with the first bulging portion 61, and the second bulging portion 422 is positioned on an inner side of the second air outlet portion 421. In this way, the first bulging portion 61 and the second bulging portion 422 can separate an air inlet passage from air outlet passages. This structure also serves as a primary structure for forming two air outlet passages.

The mosquito trapping device further includes a grill 7, where the grill 7 is mounted on the support cover 6 and positioned right below the fan 3, the accommodation tank 611 is delimited by the grill 7 and the first bulging portion 61, and the grill 7 is provided with a first through hole 71 in communication with the accommodation tank 611. In this way, the grill 7 plays a role of supporting the fan 3 without affecting air inletting.

The first lattice cover 41 is provided with a plate 412, so that an air outlet area can be expanded, and an air outletting force can be weakened. The first air outlet portion 411 is arranged on a tank wall of the plate 412, so that an air outlet direction is perpendicular to an air inlet direction, and an air outlet of the first air outlet portion 411 surrounds a periphery of an air inlet. Accordingly, the air inlet will not be disturbed, and an attractant odor can be diffused, so that the attractant odor surrounds a periphery of the air inlet all the time.

When the fan 3 is in use, air sequentially flows through the first air inlet portion 431 and the second air inlet portion 241, so as to enter the mosquito storage box 2, and then sequentially flows through the third air outlet portion 211 and the first accommodation space 11, so as to be blown out from the first air outlet portion 411, so that a first air duct is formed; and moreover, air sequentially flows through the first air inlet portion 431 and the second air inlet portion 241, so as to enter the mosquito storage box 2, and then sequentially flows through the third air outlet portion 211 and the first accommodation space 11, so as to be blown out from the second air outlet portion 421, so that a second air duct is formed. Therefore, the device is formed into an air duct structure having one air inlet passage and two air outlet passages when the fan is in use.

The mosquito trapping device further includes an attractant accommodation portion 8, where the attractant accommodation portion 8 is provided with an opening end 81, and the opening end 81 is in communication with the plate 412. In this way, the attractant accommodation portion 8 is configured to place the attractant, so as to enhance a mosquito attraction function.

Figure 6:
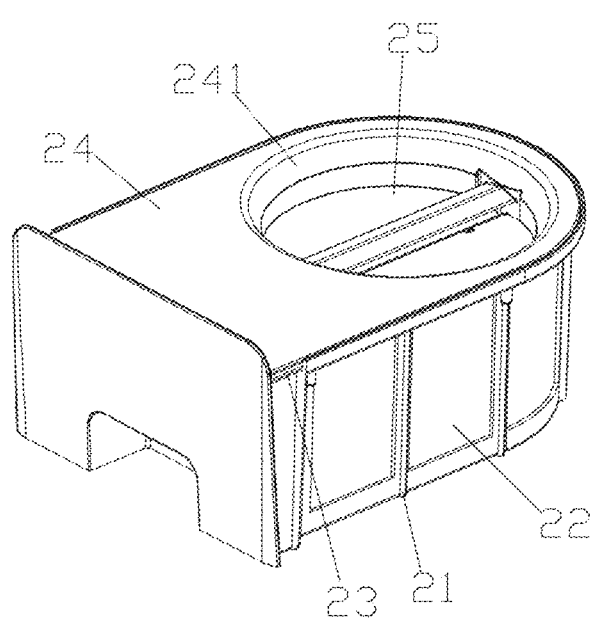
FIG. 6 is a solid schematic structural diagram of a mosquito storage box of the mosquito trapping device shown in FIG. 2.
Figure 7:
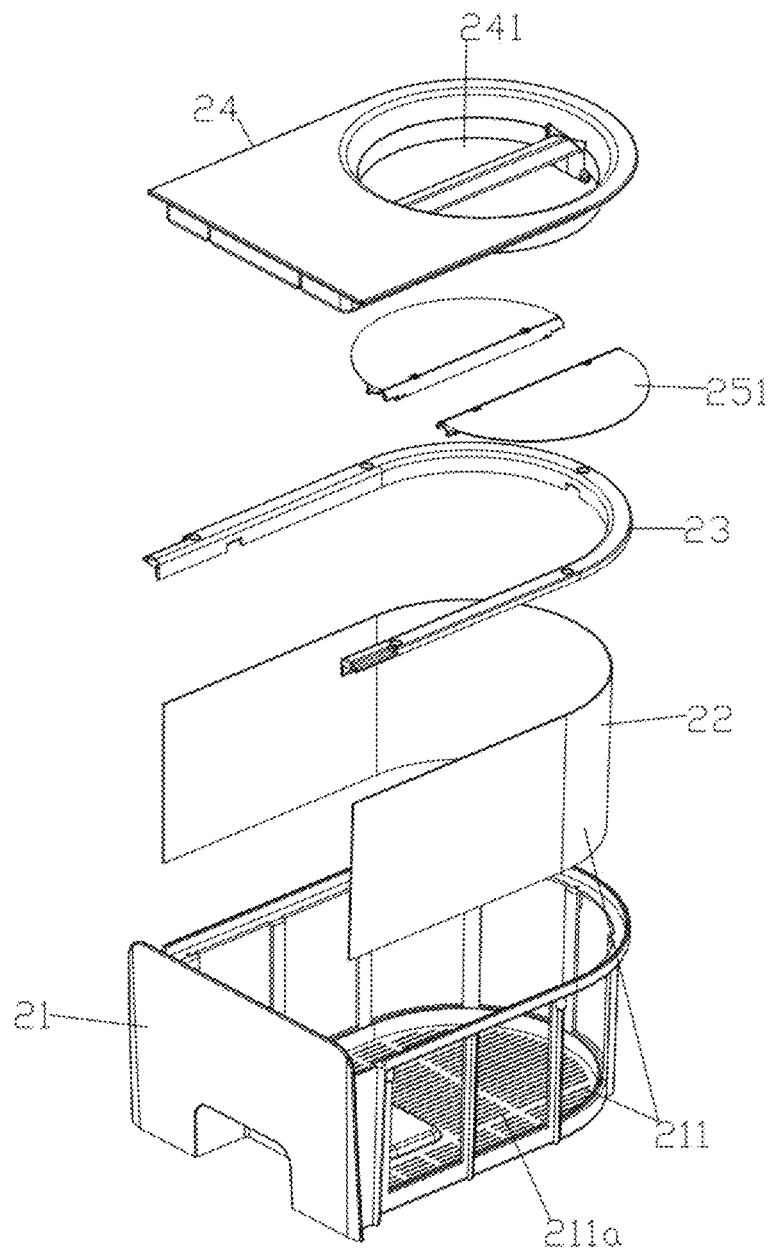
FIG. 7 is an exploded schematic structural diagram of the mosquito storage box shown in FIG. 6.

As shown in FIGS. 6-7, in the present embodiment, the mosquito trapping box includes a box body 21, a lattice-shaped member 22, a fixing member 23, and a cover body 24, where the lattice-shaped member 22 is mounted on an inner wall of the box body 21 through the fixing member 23, the cover body 24 is mounted on an upper end portion of the box body 21, and an accommodation cavity 20 is delimited by the lattice-shaped member 22, the cover body 24, and the box body 21 jointly; and the second air inlet portion 241 is arranged on the cover body 24, and the third air outlet portion 211 is arranged on the box body 21 and/or the lattice-shaped member 22. In the present embodiment, the lattice-shaped member 22 is a dense lattice through which air instead of the mosquitoes can pass.

The second air inlet portion 241 includes a second through hole formed on the cover body 24, and the third air outlet portion 211 includes a third through hole 211a formed at a bottom of the box body 21 and/or lattice holes formed on the lattice-shaped member 22. The third air outlet portion 211 may be the third through hole 211a separately provided at the bottom of the box body 21 or the lattice holes separately provided on the lattice-shaped member 22, or may be of an air outlet structure combining the third through hole 211a and the lattice holes. In the present embodiment, the third air outlet portion 211 is of the air outlet structure combining the third through hole 211a and the lattice holes.

The mosquito trapping box further includes a shielding portion 25 configured to shield the second through hole, and the shielding portion 25 includes a pair of shielding sheets 251 rotatably mounted on the cover body 24 through a rotary shaft. Torsional springs may also be arranged to automatically restore the shielding sheets 251.

When the fan 3 does not work, the shielding sheets 251 are attached to the cover body 24, so as to completely shield the second through hole, so that the second through hole is closed; and when the fan 3 is in use, the shielding sheets 251 move away from the cover body 24 under the action of air, so that the second through hole is opened.

In this way, the mosquito trapping box of the present disclosure has a simple structure, and can effectively ensure that the air ducts normally run while ensuring that the mosquitoes are effectively trapped in the box body 21.

The mosquito trapping device further includes a control portion 9 and a power supply portion 10; where the control portion 9 includes a control panel 91 mounted on the first lattice cover 41 and a control circuit board arranged in the first accommodation space 11; and the power supply portion 10 includes a power plug 101, and the power plug 101, the control panel 91, and the fan 3 are connected to the control circuit board through wires.

Preferably, the sum of an air outlet volume of the first air outlet portion 411 on the first lattice cover 41 and an air outlet volume of the second air outlet portion 421 on the second lattice cover 42 is six times or more an air inlet volume of the first air inlet portion 431 of the third lattice cover 43. In this way, it can be effectively ensured that the air outletting force is smaller than an air inletting force.

Preferably, in the present embodiment, the body 1, the mosquito storage box 2, the fan 3, the lattice cover assembly 4, the attractant accommodation portion 8, the control panel 91 of the control portion 9, and the power plug 101 of the power supply portion 10 have dark (such as black) appearances. In this way, the dark appearance can enhance the mosquito attracting effect.

The present disclosure provides the mosquito trapping device in a novel structure. According to the device, the air duct structure having one air inlet passage and two air outlet passages is formed through the fan 3. Therefore, the mosquitoes around can be effectively trapped into the mosquito storage box 2 through the air duct structure. The fan 3 is the only power consuming component for mosquito trapping, and no other complex mosquito trapping and attracting facilities are used. An entire structure is simple, a cost is low, and a mosquito trapping function can be realized through the special structure design.

Example 2

The mosquito trapping device in the present embodiment has basically the same structure as that in Embodiment 1. The difference lies in that no second air outlet portion 421 is provided on an outer wall of a second lattice cover 42.

An air outlet volume of a first air outlet portion 411 on a first lattice cover 41 is six times or more an air inlet volume of a first air inlet portion 431 on a third lattice cover 43.

What are described above are merely some embodiments of the present disclosure. Those of ordinary skill in the art can also make several variations and improvements without departing from the creative concept of the present disclosure. These variations and improvements fall within the scope of protection of the present disclosure.

What is claimed is:

1. A mosquito trapping device, comprising:
a body,
a mosquito storage box,
a fan, and
a lattice cover assembly, wherein
the lattice cover assembly is arranged on an upper end portion of the body and forms a first accommodation space between the lattice cover assembly and the body, and the mosquito storage box is mounted on the body;
the lattice cover assembly comprises a first lattice cover, a second lattice cover, and a third lattice cover, wherein the first lattice cover is mounted on the upper end portion of the body and provided with a first air outlet portion in communication with the first accommodation space, the second lattice cover sleeves sits in a middle of the first lattice cover and is positioned at a periphery of the fan, the third lattice cover is mounted on the second lattice cover and positioned right above the fan, and the third lattice cover is provided with a first air inlet portion matching the fan;
the mosquito storage box is provided with a second air inlet portion positioned right below the fan and a third air outlet portion in communication with the first accommodation space;
the first lattice cover is provided with a plate, and an upper end portion of the second lattice cover is positioned in the plate;
the first air outlet portion is arranged on a tank wall of the plate; and
when the fan is in use, air sequentially flows through the first air inlet portion and the second air inlet portion to enter the mosquito storage box, and then sequentially flows through the third air outlet portion and the first accommodation space to be blown out from the first air outlet portion, so that a first air duct is formed.

2. The mosquito trapping device according to claim 1, wherein the second lattice cover is provided with a second air outlet portion in communication with the first accommodation space;
when the fan is in use, air sequentially flows through the first air inlet portion and the second air inlet portion to enter the mosquito storage box, and then sequentially flows through the third air outlet portion and the first accommodation space to be blown out from the second air outlet portion, so that a second air duct is formed;
an air outlet volume of the first air outlet portion is six times or more an air inlet volume of the first air inlet portion; and alternatively,
a sum of an air outlet volume of the first air outlet portion and an air outlet volume of the second air outlet portion is six times or more an air inlet volume of the first air inlet portion.

3. The mosquito trapping device according to claim 2, further comprising a support and a support cover, wherein the support is mounted in the body and provided with a second accommodation space configured to accommodate the mosquito storage box; and the mosquito storage box is detachably mounted in the second accommodation space, the support cover is mounted above the support, and the fan is mounted above the support cover.

4. The mosquito trapping device according to claim 3, wherein the support cover is provided with a first bulging portion extending upwards, and the first bulging portion is provided with an accommodation tank configured to accommodate the fan; and the second lattice cover is internally provided with a second bulging portion extending downwards, the second bulging portion is linked with the first bulging portion, and the second bulging portion is positioned on an inner side of the second air outlet portion.

5. The mosquito trapping device according to claim 4, further comprising a grill, wherein the grill is mounted on the support cover and positioned right below the fan, the accommodation tank is delimited by the grill and the first bulging portion, and the grill is provided with a first through hole in communication with the accommodation tank.

6. The mosquito trapping device according to claim 1, further comprising an attractant accommodation portion, wherein the attractant accommodation portion is provided with an opening end, and the opening end is in communication with the plate; and each of the body, the mosquito storage box, the fan, the lattice cover assembly, and the attractant accommodation portion comprise a dark material.

7. The mosquito trapping device according to claim 1, wherein the mosquito trapping box comprises a box body, a container, a fixing member, and a cover body, a lattice-shaped member is mounted on an inner wall of the box body through the fixing member, the cover body is mounted on an upper end portion of the box body, and an accommodation cavity is delimited by the lattice-shaped member, the cover body, and the box body; and the second air inlet portion is arranged on the cover body, and the third air outlet portion is arranged on the box body and/or the lattice-shaped member.

8. The mosquito trapping device according to claim 7, wherein the second air inlet portion comprises a second through hole formed on the cover body, and the third air outlet portion comprises a third through hole formed at a bottom of the box body and/or holes formed on the container.

9. The mosquito trapping device according to claim 8, wherein the mosquito trapping box further comprises a shielding portion configured to shield the second through hole, and the shielding portion comprises a pair of shielding sheets rotatably mounted on the cover body;

when the fan is off, the shielding sheets are attached to the cover body to completely shield the second through hole, so that the second through hole is closed; and when the fan is in use, the shielding sheets move away from the cover body under an action of air, so that the second through hole is opened.

10. The mosquito trapping device according to claim 1, further comprising a control portion and a power supply portion; wherein the control portion comprises a control panel mounted on the first lattice cover and a control circuit board arranged in the first accommodation space; and the power supply portion comprises a power plug, wherein the power plug, the control panel, and the fan are connected to the control circuit board through wires.

* * * * *